US011347838B2

(12) United States Patent
Wright et al.

(10) Patent No.: US 11,347,838 B2
(45) Date of Patent: May 31, 2022

(54) BLOCKCHAIN IMPLEMENTED COUNTING SYSTEM AND METHOD FOR USE IN SECURE VOTING AND DISTRIBUTION

(71) Applicant: nChain Holdings Limited, St. John's (AG)

(72) Inventors: Craig Steven Wright, London (GB); Stephane Savanah, London (GB)

(73) Assignee: nChain Holdings Ltd., St. John's (AG)

( * ) Notice: Subject to any disclaimer, the term of this patent is extended or adjusted under 35 U.S.C. 154(b) by 166 days.

(21) Appl. No.: 16/079,093

(22) PCT Filed: Feb. 14, 2017

(86) PCT No.: PCT/IB2017/050820
§ 371 (c)(1),
(2) Date: Aug. 22, 2018

(87) PCT Pub. No.: WO2017/145005
PCT Pub. Date: Aug. 31, 2017

(65) Prior Publication Data
US 2019/0058592 A1    Feb. 21, 2019

(30) Foreign Application Priority Data

Feb. 23, 2016  (GB) ...................................... 1603112
Feb. 23, 2016  (GB) ...................................... 1603114

(51) Int. Cl.
*G06F 21/52*    (2013.01)
*H04L 9/00*     (2022.01)
(Continued)

(52) U.S. Cl.
CPC .............. *G06F 21/52* (2013.01); *G06F 21/64* (2013.01); *G06N 7/00* (2013.01); *G06Q 20/065* (2013.01);
(Continued)

(58) Field of Classification Search
CPC .... G06F 21/52; G06F 21/64; G06F 2221/033; G06F 12/1408; G06F 21/72; H04L 9/00;
(Continued)

(56) References Cited

U.S. PATENT DOCUMENTS 5,600,725 A    2/1997  Rueppel et al.
5,761,305 A    6/1998  Vanstone et al.
(Continued)

FOREIGN PATENT DOCUMENTS

AU    2016100059 A4    3/2016
CA       2867765 A1    4/2016
(Continued)

OTHER PUBLICATIONS

Menezes et al., "Handbook of Applied Cryptography: pp. 33, 38," CRC Press, Oct. 16, 1996, 3 p.
(Continued)

*Primary Examiner* — J. Brant Murphy
(74) *Attorney, Agent, or Firm* — Davis Wright Tremaine LLP

(57) ABSTRACT

This invention relates generally to blockchain implementations and is suited for, but not limited to, use with the Bitcoin blockchain. The invention relates to a technical solution for managing a voting, counting, selection and/or decision making process. It can be used for the implementation of automated processes such as device/system control, process control, distributed computing and storage and others. The invention provides an event detecting, monitoring and/or counting mechanism. The event may be, for example, a vote, decision or selection which is made by a given entity. The invention provides a counting solution in which a computing resource, running simultaneously and in parallel to the blockchain, manages a loop-based operation. The computing resource continuously monitors the state of the block-
(Continued)

```
# If Condition Then Action   code block example

IF trigger_detected [1] THEN
    Perform Action [2]
    Increment index and update control data [3]
END-IF

[1] the "trigger" may be a particular state of the blockchain,
or an event detected off-block (e.g. a date or temperature
reading, etc.) or a combination of both

[2] Action may include sending a signal to cause an event off
clock, or broadcasting a new transaction, or a combination of
both

[3] The index may be maintained (i) off block within the
Manager or may be (ii) a value stored within a transaction
that is then broadcast.
(i) and (ii) represent two alternative ways to maintain the
control data
``` chain as well as any other off-blockchain input data or source. The execution of the loop is influenced by the state of the blockchain. Each iteration of the loop that is executed by the computing resource is recorded in a transaction that is written to the blockchain. It is stored as a hash within the transaction's metadata. If the computing resource finds a transaction which contains a hash relating to the loop it accesses the relevant portion of code. The loop contains a conditional statement which enables the computing resource to decide which action to take. The condition may be dependent upon the state of the blockchain or any other data source. The action can be any type of action, on or off the blockchain. Thus, the combination of the computing resource and blockchain provide a Turing-complete solution.

43 Claims, 5 Drawing Sheets

(51) Int. Cl.
| | |
|---|---|
| *G06Q 20/06* | (2012.01) |
| *H04L 9/32* | (2006.01) |
| *G06F 21/64* | (2013.01) |
| *G06N 7/00* | (2006.01) |
| *G06Q 20/38* | (2012.01) |
| *H04L 9/06* | (2006.01) |
| *H04L 9/08* | (2006.01) |

(52) U.S. Cl.
CPC ....... *G06Q 20/389* (2013.01); *G06Q 20/3827* (2013.01); *H04L 9/00* (2013.01); *H04L 9/0637* (2013.01); *H04L 9/0643* (2013.01); *H04L 9/0825* (2013.01); *H04L 9/3213* (2013.01); *H04L 9/3236* (2013.01); *G06F 2221/033* (2013.01); *G06Q 2220/00* (2013.01); *H04L 2209/38* (2013.01); *H04L 2209/463* (2013.01); *H04L 2209/56* (2013.01)

(58) Field of Classification Search
CPC ... H04L 9/3236; H04L 9/0643; H04L 9/0637; H04L 9/0825; H04L 9/3213; H04L 2209/38; H04L 2209/463; H04L 2209/56; G06Q 20/065; G06Q 20/3827; G06Q 20/389; G06Q 2220/00; G06N 7/00
See application file for complete search history.

(56) References Cited

U.S. PATENT DOCUMENTS

| | | |
|---|---|---|
| 5,867,578 A | 2/1999 | Brickell et al. |
| 5,889,865 A | 3/1999 | Vanstone et al. |
| 5,896,455 A | 4/1999 | Vanstone et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,520,855 B2 | 2/2003 | DeMar et al. |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 7,006,633 B1 | 2/2006 | Reece |
| 7,095,851 B1 | 8/2006 | Scheidt |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,258,130 B2 | 2/2016 | Hwang et al. |
| 9,298,806 B1 | 3/2016 | Vessenes et al. |
| 9,673,975 B1 | 6/2017 | Machani |
| 10,050,779 B2 | 8/2018 | Alness et al. |
| 10,068,228 B1 | 9/2018 | Winklevoss et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 | 7/2020 | Kurani |
| 11,115,196 B1 | 9/2021 | Triandopoulos et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0193890 A1 | 9/2004 | Girault |
| 2005/0071283 A1 | 3/2005 | Randle et al. |
| 2005/0138374 A1 | 6/2005 | Zheng et al. |
| 2006/0023887 A1 | 2/2006 | Agrawal et al. |
| 2006/0153365 A1 | 7/2006 | Beeson |
| 2006/0153368 A1 | 7/2006 | Beeson |
| 2006/0156013 A1 | 7/2006 | Beeson |
| 2006/0161485 A1 | 7/2006 | Meldahl |
| 2006/0179319 A1 | 8/2006 | Krawczyk |
| 2006/0248114 A1 | 11/2006 | Anderson et al. |
| 2007/0055880 A1 | 3/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0285759 A1 | 11/2008 | Shaw |
| 2008/0288773 A1 | 11/2008 | Nguyen et al. |
| 2009/0048979 A1 | 2/2009 | Al-Herz et al. |
| 2009/0161876 A1 | 6/2009 | Sherkin |
| 2010/0005302 A1 | 1/2010 | Vishnu et al. |
| 2010/0023771 A1 | 1/2010 | Struik |
| 2010/0031369 A1 | 2/2010 | Grummt |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2011/0016510 A1 | 1/2011 | Matsuda et al. |
| 2011/0022854 A1 | 1/2011 | Macchetti et al. |
| 2011/0202773 A1 | 8/2011 | Ghouti et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0100833 A1 | 4/2012 | Gao |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0177157 A1 | 7/2013 | Li et al. |

(56) References Cited

U.S. PATENT DOCUMENTS

| | | |
|---|---|---|
| 2013/0191632 A1 | 7/2013 | Spector et al. |
| 2013/0304642 A1 | 11/2013 | Campos |
| 2013/0305057 A1 | 11/2013 | Greco et al. |
| 2014/0012751 A1 | 1/2014 | Kuhn et al. |
| 2014/0068246 A1 | 3/2014 | Hartley et al. |
| 2014/0082358 A1 | 3/2014 | Nakhjir et al. |
| 2014/0129844 A1 | 5/2014 | Johnson et al. |
| 2014/0223580 A1 | 8/2014 | Neivanov et al. |
| 2014/0250006 A1 | 9/2014 | Makhotin et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0095648 A1 | 4/2015 | Nix |
| 2015/0120567 A1* | 4/2015 | Van Rooyen ............ G06F 21/10 705/59 |
| 2015/0154562 A1 | 6/2015 | Emmerson |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1* | 7/2015 | Yago ................ G06Q 20/0655 705/68 |
| 2015/0213433 A1 | 7/2015 | Khan |
| 2015/0244690 A1 | 8/2015 | Mossbarger |
| 2015/0254463 A1 | 9/2015 | Ryhorchuk et al. |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0294425 A1 | 10/2015 | Benson |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0379510 A1 | 12/2015 | Smith |
| 2015/0381729 A1 | 12/2015 | Manohar et al. |
| 2016/0027229 A1* | 1/2016 | Spanos ................ G07C 13/00 705/51 |
| 2016/0028552 A1 | 1/2016 | Spanos et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | McConaghy et al. |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1* | 9/2016 | Ford ..................... H04L 9/3239 |
| 2016/0269182 A1 | 9/2016 | Sriram et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046698 A1 | 2/2017 | Haldenby et al. |
| 2017/0046792 A1 | 2/2017 | Haldenby et al. |
| 2017/0075877 A1 | 3/2017 | Lepeltier |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0103385 A1 | 4/2017 | Wilson, Jr. et al. |
| 2017/0124348 A1 | 5/2017 | Pourzandi et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0178237 A1 | 6/2017 | Wong |
| 2017/0178263 A1 | 6/2017 | Kraemer et al. |
| 2017/0187535 A1 | 6/2017 | Middleton et al. |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0250801 A1 | 8/2017 | Chen et al. |
| 2017/0300877 A1 | 10/2017 | Mann et al. |
| 2017/0316390 A1 | 11/2017 | Smith et al. |
| 2017/0324715 A1 | 11/2017 | Frincu et al. |
| 2018/0025670 A1 | 1/2018 | Ikarashi et al. |
| 2018/0034810 A1 | 2/2018 | Pe'Er et al. |
| 2018/0109377 A1 | 4/2018 | Fu |
| 2018/0123780 A1 | 5/2018 | Ikarashi |
| 2018/0146367 A1 | 5/2018 | Altin et al. |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1* | 1/2019 | Nolan ................ G06Q 20/027 |
| 2019/0080321 A1 | 3/2019 | Mundis et al. |
| 2019/0080404 A1* | 3/2019 | Molinari ............. G06Q 20/223 |
| 2019/0080406 A1* | 3/2019 | Molinari ............... G06Q 40/02 |
| 2019/0130368 A1* | 5/2019 | Li ......................... G06Q 20/02 |
| 2019/0149337 A1 | 5/2019 | Savanah et al. |
| 2019/0158470 A1 | 5/2019 | Wright et al. |
| 2019/0188793 A1* | 6/2019 | Molinari ............... H04L 9/0637 |
| 2019/0199531 A1* | 6/2019 | Staples ................ H04L 9/0891 |
| 2019/0220859 A1 | 7/2019 | Weight et al. |
| 2019/0229911 A1 | 7/2019 | Allen |
| 2019/0238334 A1 | 8/2019 | Nakamura |
| 2019/0340352 A1 | 11/2019 | Peeters et al. |
| 2019/0349733 A1 | 11/2019 | Nolan et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0285935 A1 | 9/2020 | Song et al. |
| 2021/0056070 A1 | 2/2021 | Kakavand et al. |
| 2021/0194677 A1 | 6/2021 | Pourzandi et al. |

FOREIGN PATENT DOCUMENTS

| | | |
|---|---|---|
| CN | 101447980 A | 6/2009 |
| CN | 102144371 A | 8/2011 |
| CN | 103440209 A | 12/2013 |
| CN | 103927656 A | 7/2014 |
| CN | 104320262 A | 1/2015 |
| CN | 105204802 A | 12/2015 |
| DE | 102010002241 B4 | 3/2012 |
| EP | 1477882 A2 | 11/2004 |
| EP | 2538606 A1 | 12/2012 |

(56) References Cited

FOREIGN PATENT DOCUMENTS

| | | | |
|---|---|---|---|
| EP | 2975570 | A1 | 1/2016 |
| EP | 3010176 | A1 | 4/2016 |
| FR | 3018370 | A1 | 9/2015 |
| FR | 3018377 | A1 | 9/2015 |
| FR | 3018378 | A1 | 9/2015 |
| FR | 3018379 | A1 | 9/2015 |
| JP | H11239124 | A | 8/1999 |
| JP | H11289324 | A | 10/1999 |
| JP | 2000502553 | A | 2/2000 |
| JP | 2001195479 | A | 7/2001 |
| JP | 2002026895 | A | 1/2002 |
| JP | 2006293764 | A | 10/2006 |
| JP | 2007242221 | A | 9/2007 |
| JP | 2008146601 | A | 6/2008 |
| JP | 2009105824 | A | 5/2009 |
| JP | 2009526411 | A | 7/2009 |
| JP | 2010503320 | A | 1/2010 |
| JP | 2010219912 | A | 9/2010 |
| JP | 2011082662 | A | 4/2011 |
| JP | 2011211461 | A | 10/2011 |
| JP | 2012-515393 | A | 7/2012 |
| JP | 2014068140 | A | 4/2014 |
| JP | 2015536617 | A | 12/2015 |
| JP | 5858506 | B1 | 2/2016 |
| RU | 2015108134 | A | 10/2016 |
| RU | 2015109271 | A | 10/2016 |
| TW | 201202975 | A | 1/2012 |
| WO | 2005096542 | A1 | 10/2005 |
| WO | 2005107141 | A1 | 11/2005 |
| WO | 2007113040 | A1 | 10/2007 |
| WO | 2012039474 | A1 | 3/2012 |
| WO | 2012054785 | A1 | 4/2012 |
| WO | 2013053058 | A1 | 4/2013 |
| WO | 2015127789 | A1 | 9/2015 |
| WO | 2015142765 | A1 | 9/2015 |
| WO | 2015171580 | A1 | 11/2015 |
| WO | 2015175854 | A2 | 11/2015 |
| WO | 2015188151 | A1 | 12/2015 |
| WO | 2016022864 | A2 | 2/2016 |
| WO | 2016137360 | A2 | 9/2016 |
| WO | 2016161073 | A1 | 10/2016 |
| WO | 2017112664 | A1 | 6/2017 |

OTHER PUBLICATIONS

Mezzomix et al., "Angebot: BTC (2-aus-3) Multisig Escrow (Treuhandabwicklung)," Bitcoin Forum, Feb. 9, 2014, https://bitcointalk org/index.php?topic=456563 0, 7 pages.

Michalko et al., "Decent Whitepaper," retrieved from http://forklog.net/decent-finalizes-its-decentralized-content-distribution-platform/, Nov. 2015, 20 pages.

Michalko, "Decent Finalizes its Decentralized Content Distribution Platform," retrieved from http://forklog.net/iecent-finalizes-its-decentralized-content-distnbution-platform/, Dec. 14, 2016, 2 pages.

Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172,11 pages.

Minsky et al., "Computation: Finite and Infinite Machines Chapter 14: Very Simple Bases for Computability," Prentice Hall, Inc, 1967,29 pages.

Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2)_Data_storage&oldid=60024, 10 pages.

Mulli, "A Decentralized Bitcoin Exchange with Bitsquare - Attack Scenarios and Countermeasures," University of Zurich Department of Informatics Communication Systems Group Master Thesis, Jul. 30, 2015, 61 pages.

Nakamoto, "Bitcoin: A Peer-to-Peer Electronic Cash System," Bitcoin, Oct. 31, 2008, https://bitcoin.org/bitcoin. 3df, 9 pages.

Noizat et al., "Blockchain Electronic Vote," retrieved from https://www.weusecoins.com/assets/pdf/library/blockchain-alectronic-vote.pdf, Apr. 29, 2015, 9 pages.

Noizat, "Handbook of Digital Currency Chapter 22: Blockchain Electronic Vote," Elsevier Inc., David Lee Kuo Chuen (ed.), May 2015, 9 pages.

Openchain, "Home Page," openchain.org, Dec. 22, 2015 [retrieved May 8, 2020], https://web.archive.org/web/20151222083734/https://www.openchain org/, 18 pages.

OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.

OpenSSL Wiki, "Evp Key Agreement," OpenSSL, https://wiki.openssl.org/index.php/EVP_Key_Agreement, Apr. 28, 2017 [retrieved Dec. 10, 2018], 2 pages.

Perry, "Tapeke: Bitcoin Accounting for Non-Accountants," http://codinginmysleep.com/tapeke-bitcoin-accounting-for-non-accountants/, Jan. 21, 2015, 1 page.

Poon et al., "The Bitcoin Lightning Network: Scalable Off-Chain Instant Payments," https://www.bitcoinlightning.com/vp-content/uploads/2018/03/lightning-network-paper.pdf, Jan. 14, 2016 [retrieved Dec. 10, 2018], 59 pages.

Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.

Pour, "Bitcoin multisig the hard way: Understanding raw P2SH multisig transactions," Dec. 20, 2014, https://vww.soroushjp.com/2014/12/20/bitcoin-multisig-the-hard-way-understanding-raw-multisignature-bitcoin-transactions/, 19 pages.

Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/Dould_microsoft_use_the_blockchain_as_a_license/?st=iw26pndq&sh=b862bf7d, 2 pages.

Reiner et al., "Bitcoin Wallet Identity Verification Specification," diyhpluswiki, http://diyhpl.US/-bryan/papers2/bitcoin/armory-verisign -bitcoin-wallet-identityspecification.pdf, Feb. 27, 2015 (retrieved Jan. 27, 2016), 24 pages.

Rockwell, "BitCongress—Process For Blockchain Voting & Law," retrieved from http://generalbitcoin.com/BitCongress_Whitepaper.pdf, Feb. 12, 2016, 8 pages.

Ryepdx et al., "Answer to What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.

Sams, "Ethereum: Turing-complete, programmable money," Cryptonomics, Feb. 1, 2014, https://cryptonomics. 3rg/2014/02/01/ethereum-turing-complete-programmable-money, 4 pages.

Sanchez," Marketplaces," GitHub, Jun. 10, 2015 [retrieved May 12, 2020], https://github.com/drwasho/openbazaar-1ocumentation/blob/master/04%20Marketplaces.md, 37 pages.

Sanchez, "Protocol," Github, https://github.com/drwasho/openbazaar-documentation/blob/master/03%20Protocol. md, Jun. 15, 2015, 53 pages.

Sanchez, "Ricardian Contracts in OpenBazaar," Github, https://gist.github.com/drwasho/a5380544c170bdbbbad8, Jan. 2016, 12 pages.

Sardesai, "Coinffeine: A P2P Alternative to Centralised Bitcoin Exchanges," Cryptocoins News, Mar. 2, 2014 [etrieved Feb. 14, 2017], https://www.cryptocoinsnews.com/coinffeine-p2p-alternative-centralised-bitcoin-exchanges/, 5 pages.

Satoshi et al., "Connection Limits," Bitcoin Forum, Aug. 9, 2010, https://bitcointalk.org/index.php?topic=741.0 3rev_next=prev, 2 pages.

Scott, "Counterparty to Create First Peer-to-Peer Digital Asset Exchange Platform," Cointelegraph, https://Dointelegraph.com/news/counterparty_to_create_first_peer_to_peer_digital_asset_exchange_platform, Apr. 10, 2014 [retrieved Dec. 12, 2018], 2 pages.

Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.

Snow et al., "Factom: Business Processes Secured by Immutable Audit Trails on the Blockchain Version 1.2," factom.com, Apr. 25, 2018, 38 pages.

Stampery, "Features: Blockchain-based data certification at your fingertips," Stampery.com, https://stampery.com/features/, archived Mar. 5, 2016 [retrieved Nov. 3, 2016], 4 pages.

(56) References Cited

OTHER PUBLICATIONS

Sullivan et al., "Peer-to-peer Affine Commitment using Bitcoin," Carnegie Mellon University, Jun. 17, 2015, 54 pages.
Swan, "Blockchain: Blueprint for a New Economy," O'Reilly, Feb. 2015, 149 pages.
Swanson, "Great Chain of Nos. Chapter 3: Next Generation Platforms," Great Wall of Nos. Mar. 4, 2014 [retrieved Jan. 30, 2017], http://www.ofnumbers.com/2014/03/04/chapter-3-next-generation-platforms/, 25 pages.
Taiwanese Office Action dated Apr. 12, 2021, Patent Application No. 109142412, 5 pages.
Taiwanese Office Action dated Jul. 28, 2020, Patent Application No. 106105709, 9 pages.
Taiwanese Office Action dated Oct. 7, 2020, Patent Application No. 106105713,4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 mailed Jun. 12, 2019, U.S. Appl. No. 16/078,605, filed Aug. 21, 2018, 31 pages.
Third-Party Submission Under 37 CFR 1.290 mailed Jun. 12, 2019, U.S. Appl. No. 16/079,089, filed Aug. 22, 2018, 19 pages.
Timeisnow77724 et al., "Help understanding counterparty, thanks in advance!," Reddit r/counterparty_xcp, https://www.reddit.eom/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report dated Apr. 25, 2016, Patent Application No. 11603117.1, filed Feb. 23, 2016, 11 pages.
UK Commercial Search Report dated Feb. 17, 2017, Patent Application No. 1604493.5, 8 pages.
UK Commercial Search Report dated Jan. 13, 2017, Patent Application No. 1604498.4, 8 pages.
UK Commercial Search Report dated Jun. 14, 2016, Patent Application No. 1607249.8, 4 pages.
UK Commercial Search Report dated Jun. 27, 2016, Patent Application No. GB1603123.9, filed Feb. 23, 2016, 11 pages.
UK Commercial Search Report dated Jun. 27, 2016, Patent Application No. GB 1603125.4,11 pages.
Fuchita, "Special Topic: Innovation and Finance, Blockchain and Financial Transaction Innovation," Nomura Capital Market Quarterly 19-2(74): 11-35, Nov. 1, 2015.
Fujimura et al., "Bright: A Concept for a Decentralized Rights Management System Based on Blockchain," 2015 EEE 5th International Conference on Consumer Electronics-Berlin (ICCE-Berlin), Septembers, 2015, 2 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hacker News, "Cryptocontracts Will Turn Contract Law into a Programming Language," retrieved from https://news.ycombinator.com/item?id=7287155, Feb. 23, 2014, 12 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute ol Electronics, Information and Communication Engineers (IEICE) Technical Report 109(85):91-96, Jun. 11, 2009.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion dated Apr. 10, 2017, Patent Application No. PCT/IB2017/050861, 11 pages.
International Search Report and Written Opinion dated Apr. 12, 2017, Patent Application No. PCT/IB2017/050829, 9 pages.
International Search Report and Written Opinion dated Apr. 12, 2017, Patent Application No. PCT/IB2017/050866, 10 pages.
International Search Report and Written Opinion dated Apr. 21, 2017, Patent Application No. PCT/IB2017/050820, 12 pages.
International Search Report and Written Opinion dated Apr. 26, 2017, International Patent Application No. PCT/B2017/050865, filed Feb. 16, 2017, 9 pages.
International Search Report and Written Opinion dated Apr. 3, 2017, Patent Application No. PCT/IB2017/050824, filed Feb. 14, 2017, 13 pages.
International Search Report and Written Opinion dated Apr. 3, 2017, Patent Application No. PCT/IB2017/050827, 10 pages.
International Search Report and Written Opinion dated Mar. 29, 2017, Patent Application No. PCT/IB2017/050821, 10 pages.
International Search Report and Written Opinion dated Mar. 30, 2017, Patent Application No. PCT/IB2017/050819, 13 pages.
International Search Report and Written Opinion dated Mar. 30, 2017, Patent Application No. PCT/IB2017/050825, 9 pages.
International Search Report and Written Opinion dated May 29, 2017, International Patent Application No. PCT/IB2017/050815, filed Feb. 14, 2017, 10 pages.
International Search Report and Written Opinion dated May 31, 2017, Patent Application No. PCT/IB2017/050856, filed Feb. 16, 2017, 11 pages.
International Search Report and Written Opinion dated May 31, 2017, Patent Application No. PCT/IB2017/050867, 11 pages.
International Search Report and Written Opinion dated May 31, 2017, Patent Application No. PCT/IB2017/050979, filed Feb. 21, 2017, 11 pages.
International Search Report and Written Opinion dated May 31, 2017, Patent Application No. PCT/IB2017/050980, 12 pages.
Japanese Notice of Reason(s) for Rejection dated Mar. 30, 2021, Patent Application No. 2018-539890, 8 pages.
Japanese Notice of Reason(s) for Rejection dated Mar. 30, 2021, Patent Application No. 2018-539893, 6 pages.
Japanese Office Action dated Feb. 16, 2021, Patent Application No. 2018-539331, 7 pages.
Japanese Office Action dated Jan. 22, 2019, Patent Application No. 2018-516682, filed Feb. 16, 2017, 14 pages.
Japanese Office Action dated Oct. 6, 2020, Patent Application No. 2018-539865, 14 pages.
Japanese Office Action dated Oct. 8, 2019, Patent Application No. 2018-539895, 9 pages.

(56) References Cited

OTHER PUBLICATIONS

Jesionek et al., "BIP0032: Hierarchical Deterministic Wallets," GitHub, https://github.com/bitcoin/bips/blob/master/bip-0032.mediawiki, Jan. 2014, 9 pages.
I2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https7/brum.ethereum.org/discussion/1634/tutorial-1-your-first-contract/p1,22 pages.
Kens et al., "Cryptocontracts Will Turn Contract Law Into a Programming Language ," Hacker News, Feb. 23, 2014, https://news.ycombinator.com/item?id=7287155,12 pages.
Killerstorm et al., "Transcript for #bitcoin-dev 2012/09/03," BitcoinStats, http://www.bitcoinstats.com/irc/bitcoin-dev/logs/201 Feb. 9, 03, Sep. 3, 2012 [retrieved Dec. 21, 2018], 14 pages.
Koblitz et al., "Cryptocash, Cryptocurrencies, and Cryptocontracts," Designs, Codes and Cryptography, 78(1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustinfo/rebooting-the-web-of-trust/blob/master/topics-andadvance-Yeadings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Lebeau, "An Ethereum Journey to Decentralize All Things," retrieved from https://medium.com/@SingularDTV/an-athereum-journey-to-decentralize-all-things- 8d62b02e232b#.r6n9w8kqh, Jul. 11, 2016, 10 pages.
Luu et al., "Demystifying Incentives in the Consensus Computer," ISBN, Oct. 2015, 14 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Zyskind et al., "Enigma: Decentralized Computation Platform with Guaranteed Privacy," Jun. 10, 2015, 14 pages.
UK Commercial Search Report dated Jun. 27, 2016, Patent Application No. GB1603125.4, filed Feb. 23, 2016, 11 pages.
UK Commercial Search Report dated Jun. 28, 2016, Patent Application No. GB 1603122.1, filed Feb. 23, 2016, 12 pages.
UK Commercial Search Report dated Jun. 6, 2016, Patent Application No. 1604497.6, filed Mar. 16, 2016, 6 pages.
UK Commercial Search Report dated Jun. 9, 2016, Patent Application No. GB1603117.1, filed Feb. 23, 2016, 12 pages.
UK Commercial Search Report dated May 16, 2016, Patent Application No. GB1603125.4, 8 pages.
UK Commercial Search Report dated May 20, 2016, Patent Application No. 1605026.2, 4 pages.
UK Commercial Search Report dated May 24, 2016, Patent Application No. GB1605571.7, filed Apr. 1, 2016, 3 pages.
UK Commercial Search Report dated May 9, 2016, Patent Application No. GB1603112.2, 6 pages.
UK Commercial Search Report dated May 9, 2016, Patent Application No. GB1603114.8, filed Feb. 23, 2016, 2 pages.
UK Commercial Search Report dated Nov. 14, 2016, Patent Application No. GB1607063.3, 8 pages.
UK Commercial Search Report dated Nov. 30, 2016, Patent Application No. 1607058.3, filed Apr. 22, 2016, 7 pages.
UK Commercial Search Report dated Oct. 10, 2016, Patent Application No. GB1607484.1, filed Apr. 29, 2016, 5 pages.
UK Commercial Search Report dated Sep. 30, 2016, Patent Application No. 1606630.0, filed Apr. 15, 2016, 7 pages.
UK Expanded Commercial Search Report dated Jun. 15, 2016, Patent Application No. 1605026.2, 5 pages.
UK IPO Search Report dated Dec. 12, 2016, Patent Application No. GB1606630.0, filed Apr. 15, 2016, 4 pages.
UK IPO Search Report dated Dec. 15, 2016, Patent Application No. GB1607063.3, 6 pages.
UK IPO Search Report dated Dec. 21, 2016, Patent Application No. GB1607058.3, filed Apr. 22, 2016, 3 pages.
UK IPO Search Report dated Dec. 28, 2016, Patent Application No. GB1604497.6, filed Mar. 16, 2016, 4 pages.
UK IPO Search Report dated Dec. 5, 2016, Patent Application No. 1607249.8, 4 pages.
UK IPO Search Report dated Dec. 6, 2016, Patent Application No. 1604493.5, 6 pages.
UK IPO Search Report dated Dec. 6, 2016, Patent Application No. 1607482.5, 5 pages.
UK IPO Search Report dated Jan. 25, 2017, Patent Application No. 1605026.2, 3 pages.
UK IPO Search Report dated Jan. 3, 2017, Patent Application No. 1604498.4, 4 pages.
UK IPO Search Report dated Jul. 26, 2016, Patent Application No. GB1603114.8, filed Feb. 23, 2016, 5 pages.
UK IPO Search Report dated Jul. 4, 2016, Patent Application No. GB1603125.4, 6 pages.
UK IPO Search Report dated Jul. 4, 2016, Patent Application No. GB1603125.4, filed Feb. 23, 2016, 6 pages.
UK IPO Search Report dated Jul. 5, 2016, Patent Application No. GB1603123.9, filed Feb. 23, 2016, 5 pages.
UK IPO Search Report dated Oct. 17, 2016, Patent Application No. GB1603117.1, filed Feb. 23, 2016, 5 pages.
UK IPO Search Report dated Oct. 21, 2016, Patent Application No. GB1603112.2, 4 pages.
UK IPO Search Report dated Oct. 26, 2016, Patent Application No. GB1603122.1, filed Feb. 23, 2016, 4 pages.
UK IPO Search Report dated Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], fittps://github.com/tradle/about/wiki/Future,-operating-business-on-chain, 9 pages.
Vietnamese Office Action mailed Sep. 27, 2018, Patent Application No. 1-2018-03358, filed Feb. 16, 2017, 2 pages.
Nalport et al., "Distributed Ledger Technology: beyond block chain - A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.
White, "How Computers Work," Que Publishing 7th Edition, Oct. 15, 2003, 44 pages.
Whitequark, "#bitcoin-wizards on 2015-07-30 - ire logs atwhitequark.org," whitequark.org, https://irclog.whitequark. 3rg/bitcoin-wizards/2015-07-30, Jul. 30, 2015 [retrieved Dec. 12, 2018], 8 pages.
Wikipedia, "Counterparty (platform)," Wikipedia, the Free Encyclopedia, last edited Dec. 6, 2019 [retrieved Jan. 13, 2020], https://en.wikipedia.org/wiki/Counterparty_(platform), 2 pages.

(56) References Cited

OTHER PUBLICATIONS

Wikipedia, "Shamir's Secret Sharing," Wikipedia the Free Encyclopedia, Jan. 20, 2017 version [retrieved on Jan. 9, 2019], https://en wikipedia.org/w/index php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willett et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 59 pages.
Willoms et al., "Using blockchain to save and verify software licensing," Bitcoin Forum, https://bitcointalk.org/index. ?hp?topic=671435.0, Jun. 30, 2014 [retrieved Dec. 13, 2018], 3 pages.
Wood, "Ethereum: A Secure Decentralised Generalised Transaction Ledger: Final Draft - Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23,2017), 9 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Zhang et al., "AntShare Trading Platform," Github.com, Jun. 3, 2016 (last edited Aug. 21, 2016) [retrieved Jan. 30, 2017], https://github com/AntShares/AntShares/wiki/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Akutsu et al., "Taking on the challenge of creating epoch-making services that impress users For services that can share the excitement of competitions around the world," Ni I Technical Journal 27(5):10-14, May 1, 2015.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-sontract-systems-ethereums-ours-1530490, Nov. 25, 2015 [retrieved Dec. 12, 2018], 4 pages.
Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.
Andersen, "Blockchain Technology: A game-changer in accounting?," Deloitte & Touche GmbH Wirtschaftsprufungsgesellschaft, Mar. 2016, 5 pages.
Andresen et al., "Relay OP_Return data TxOut as standard transaction type #2738," Github, Jun. 4, 2013, ittps://github.com/bitcoin/bitcoin/pull/2738, 12 pages.
Anonymous, "Bitcoin Developer Guide," Bitcoin Project, https://web.archive.org/web/20160515171209/https7/5itcoin.org/en/developer-guide, May 15, 2016 [retrieved Mar. 13, 2019], 55 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www.coinffeine. com/, 2 pages.
Antonopoulos, "Mastering Bitcoin—Unlocking Digital Cryptocurrencies," O'Reilly Media, Inc., Dec. 20, 2014, 282 pages.
Australian Office Action for Application No. 2017223158, dated Jun. 22, 2021, 7 pages.

Bitcoininvestor.Com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Bitcoininvestor.Com, "All-Star Panel: Ed Moy, Joseph VaughnPerling, Trace Mayer, Nick Szabo, Dr. Craig Wright," YouTube, Nov. 12, 2015, https://www.youtube.com/watch?v=LdvQTwjVmrE, 1 page.
Bitfreak! et al., "Understanding Stealth Addresses/Payments," Bitcoin Forum, Jun. 10, 2015 (retrieved Jun. 16, 2020), https://bitcointalk.org/index.php?topic=1086498.0, 8 pages.
Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.11.pdf, 20 pages.
Block Chan, "Tweet dated Nov. 7, 2018," Twitter, Nov. 7, 2018, https://twitter.com/block chan/status/1060336404163584000, 1 page.
Bluematt, http://bitcoinstats.com/irc/bitcoin-dev/logs/2015/03/16.
Bradbury, "Developers Battle Over Bitcoin Block Chain," Coindesk, http://www.coindesk.com/developers-battle-bitcoin-b lock-chain/, Mar. 25, 2014, 3 pages.
Brown et al., "Standards for Efficient Cryptography 1: Elliptic Curve Cryptography Version 2.0," Certicom Research, Way 21, 2009, 144 pages.
Brown et al., "Standards for Efficient Cryptography 2: Recommended Elliptic Curve Domain Parameters Version 2.0," Certicom Research, Jan. 27, 2010, 37 pages.
Burgess et al., "The Promise of Bitcoin and the Blockchain," Consumers' Research, Jul. 13, 2015, 97 pages.
Buterin et al., "Ethereum Development Tutorial," GitHub, Jul. 1, 2014 [retrieved Jul. 20, 2021], https://github.com/2thereum/wikiAviki/ethereum-development-tutorial/Oc1f501ea03a787910049b-03723f1bfd7a14c9c6, 13 pages.
Buterin, "Bitcoin Multisig Wallet: The Future Of Bitcoin," Bitcoin Magazine, Mar. 13, 2014 [retrieved May 12, 2020], https://bitcoinmagazine com/articles/multisig-future-bitcoin-1394686504, 7 pages.
Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme ECQV) Version 1.0," Certicom Research, Jan. 24, 2013, 32 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.
Christidis et al., "Blockchains and Smart Contracts for the Internet of Things," IEEE Access 4(1):2292-2303, Way 10, 2016.
Coinprism, "80 bytes Op_Re I Urn explained," Coinprism Blog, http://blog.coinprism.eom/2015/02/11/80-bytes-op-return/, Feb. 11, 2015 [retrieved Dec. 21, 2018], 8 pages.
Corallo, "[Bitcoin-development] Relative CHECKLOCKTIMEVERIFY (was CLTV proposal)," Linux Foundation, https://lists.linuxfoundation.org/pipermail/bitcoin-dev/2015-May 00 7858.html, May 4, 2015 [retrieved Dec. 12, 2018], 3 pages.
Counterparty, "Home Page," Counterparty, copyright 2018 [retrieved Jan. 13, 2020], counterparty.io, 3 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin. stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip.0047.mediawiki, 16 pages.

(56) References Cited

OTHER PUBLICATIONS

Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Dixon, "True peer-to-peer currency exchange?," DGC Magazine, Jul. 2, 2013 [retrieved May 12, 2020], http://igcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], fittp://blog.coinprism.com/2014/12/10/colored-coins-and-ricardian-contracts/, 9 pages.
DRCODE, "New Kid on the Blockchain," Hacker News, https://news.ycombinator.com/item?id=11372455, Mar. 28, 2016 [Dec. 12, 2018], 32 pages.
Durback, "Standard BIP Draft: Turing Pseudo-Completeness," Bitcoin-Dev, Dec. 10, 2015, https://bitcoin-ievelopment.narkive.com/uRciVtAQ/standard-bip-draft-turing-pseudo-completeness, 11 pages.
Eragmus et al., "Time to lobby Bitcoin's core devs: "SF Bitcoin Devs Seminar - Scalability to billions of transactions per day, satoshi-level Micropayments, near-zero risk of custodial theft, & Instant transactions"... but only w/ a malleability-fixing soft fork," Reddit r/bitcoin, https://www.reddit.com/r/Bitcoin/comments/2z2191/time_to_lobby_bitcoins_core_devs_sf_bitcoin_devs/, Mar. 14, 2015 [Dec. 12, 2018], 21 pages.
European Communication pursuant to Article 94(3) EPC dated Jan. 2, 2020, Patent Application No. 18166910.2-1218, filed Feb. 16, 2017, 4 pages.
European Communication pursuant to Article 94(3) EPC dated Jul. 1, 2019, Application No. 17707121.4-1218, filed Feb. 14, 2017, 6 pages.
Extended European Search Report mailed Jul. 18, 2018, Patent Application No. 18166910.2-1218, filed Feb. 16, 2017, 8 pages.
Familiar et al., "Transcript for #bitcoin-dev Mar. 27, 2015," BitcoinStats, http://bitcoinstats.com/irc/bitcoin-dev/ogs/2015/03/27, Mar. 27, 2015 [archived version Jun. 27, 2016], 11 pages.
Fimkrypto, "Fimk 0.6.4 RELEASED," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Fotiou et al., "Decentralized Name-based Security for Content Distribution using Blockchains," retrieved from, Mobile Multimedia Laboratory, Department of Informatics, Apr. 14, 2016, 6 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.
Friedenbach, "[Bitcoin-development] New Output Script Type," Linux Foundation, Sep. 14, 2013, https://lists.inuxfoundation.org/pipermail/bitcoin-dev/2013-September/003256.html, 2 pages.

\* cited by examiner

```
i = 0
repeat {
# If Condition Then Action
        i = i + 1;
} until (i = J)

Get cryptographic hash (H₁) of the code above
```

If *Condition* Then *Action*   code block example

IF *trigger_detected* [1] THEN
    Perform *Action* [2]
    Increment index and update control data [3]
END-IF

[1] the *"trigger"* may be a particular state of the blockchain, or an event detected off-block (e.g. a date or temperature reading, etc.) or a combination of both

[2] *Action* may include sending a signal to cause an event off clock, or broadcasting a new transaction, or a combination of both

[3] The index may be maintained (i) off block within the Manager or may be (ii) a value stored within a transaction that is then broadcast.
(i) and (ii) represent two alternative ways to maintain the control data

Fig. 3

| Word | Opcode | Hex | Input | Output | Description |
|---|---|---|---|---|---|
| OP_TOALSTACK | 107 | 0x6b | x1 | (alt)x1 | Puts the input onto the top of the alt stack. Removes it from the main stack. |
| OP_FROMALSTACK | 108 | 0x6c | (alt)x1 | x1 | Puts the input onto the top of the main stack. Removes it from the alt stack. |

Fig. 4

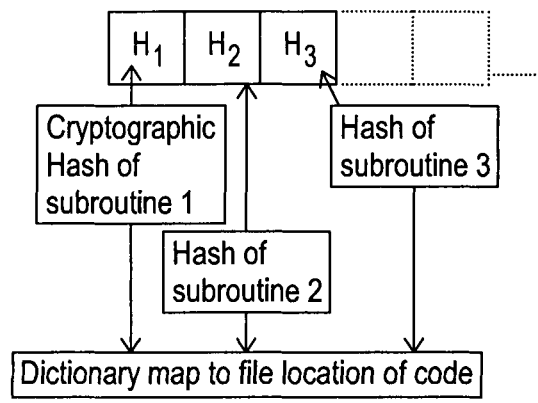

Fig. 5

| Field | Subfield | Bytes | Value | Description |
|---|---|---|---|---|
| Metadata-CodeHash | CodeHash | 20 | | RIPEMD-160 (SHA256(the actual code file addressed by CodePointer)). |
| | Index | 12 | | Integer index *i* denoting which iteration of the loop is at. |
| Metadata-CodPointer | CodeType | 4 | 0x00000001 | Indicates it is a Manager code that performs loops. |
| | CodePointer | 16 | | IPv6 address of the actual code file location. |
| | Padding | 12 | 0x00000... | Spare bytes. |

Fig. 6

| Field | Subfield | Bytes | Value | Description |
|---|---|---|---|---|
| Metadata-OutputHash | OutputHash | 20 | | RIPEMD-160 (SHA256(the output metadata file addressed by OutputPointer)). |
| | Padding | 12 | 0x00000... | Spare bytes. |
| Metadata-OutputPointer | OutputPointer | 16 | | IPv6 address of the metadata relating to the output of the code. |
| | Padding | 16 | 0x00000... | Spare bytes. |

Fig. 7

Redeem Script: 4 Metadata-OldCodeHash Metadata-NewCodeHash Metadata-OldCodePointer Metadata-NewCodePointer PK-User PK-OS PK-Developer PK-Vendor 8 OP-CHECKMULTSIG Locking Script: OP_HASH160 < 20-byte hash of redeem script > OP_EQUAL Unlocking Script: Sig-User Sig-OS Sig-Developer Sig-Vendor Redeem Script Legend:
  Hash: Hash of the code block
  Metadata: Metadata associated with the transaction
  OS: Operating System
  PK: Public Key
  Sig: Signature

Fig. 8

Redeem Script: 4 Metadata-OldCodeHash Metadata-NewCodeHash Metadata-OldCodePointer Metadata-NewCodePointer PK-User PK-OS PK-Developer PK-Vendor 8 OP-CHECKMULTSIG Locking Script: OP_HASH160 < 20-byte hash of redeem script > OP_EQUAL Unlocking Script: Sig-User Sig-OS Sig-Developer Sig-Vendor Redeem Script Legend:
  Hash: Hash of the code block
  Metadata: Metadata associated with the transaction
  OS: Operating System
  PK: Public Key
  Sig: Signature

Fig. 9

Voting Counting Bot Example Repeat Loop
The conditions of the vote
We have 100 people and if we have 57 yes votes by 1$^{st}$ January 2016, we will release payments to Jason.

Part1. Run the send vote tokens bot
i. Generate 100 Bitcoin public keys and fill each with a small amount of Bitcoins.
ii. Each address represents an authorised token which must be used to cast a vote.
iii. Securely send the token and the corresponding private key to each person entitled to vote.
iv. The bot will keep the list public key associated with each authorized token, and make this list public before the vote.
v. To ensure voting cannot be rigged, destroy the list of private keys.
vi. To ensure voting is anonymous, destroy any association of token with voter's identity to anonymise them.

Part2. Run the vote count bot
```
Array_of_tokens = [list of 100 authorized tokens];
Yes_count = 0;
repeat {
        this_token = pop from Array_of_tokens;
        if ( signature received from this_token and
            current date < 1st January 2016 )
                Increment Yes_count;
        }
} until (Array_of_tokens is empty)

if ( Yes_count > = 57 ) {
                Pay to Jason's Account.
}
```

Fig. 10

BLOCKCHAIN IMPLEMENTED COUNTING SYSTEM AND METHOD FOR USE IN SECURE VOTING AND DISTRIBUTION

This invention relates generally to blockchain implementations and technologies. The invention is particularly suited, but not limited to, use with the Bitcoin Blockchain and for applications such as device/system control, process control, distributed computing and storage. In particular, the invention relates to a technical solution for managing a voting, counting, selection and/or decision making process. The invention is not limited to use in political voting applications or scenarios.

In this document we use the term 'blockchain' to include all forms of consensus-based electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. These include but are not limited to:

Storing metadata
Implementing digital tokens
Establishing contracts that are signed with digital signatures.

It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing, cryptographic security features etc) while being more versatile in their applications.

One area of current interest within the blockchain community is Turing Completeness, and specifically how to facilitate Turing Complete behaviour into blockchain technologies, which have been designed to restrict functionality for security reasons.

It is disputed whether Bitcoin scripting language is Turing complete because it does not natively support complex flow control functionality, for example, loops to occur. One advantage of this restriction is that the programs have predictable execution times.

Another significant advantage of limiting the Bitcoin scripts to linear or tree-like decision tasks is that this avoids infinite loops, which can be used as a means of launching exploits such as a denial of service (DoS or DDoS) attack. As a result of this limitation, Bitcoin scripts are often limited to being used for linear tasks rather than more complex applications such as the control of automated tasks, device management etc.

The Ethereum blockchain platform approaches this issue by incorporating a "built in" Turing complete language called Solidity. This language is native to the Ethereum platform so that scripts written in Solidity can include control flow mechanisms such as loops. However, Ethereum has suffered from several attacks and exploits.

There also remains a desire within a significant portion of the blockchain community to preserve the use of these limited scripting languages in relation to blockchain technologies due to the security concerns mentioned above, and because of the widespread use and familiarity of the Script language used by Bitcoin.

Thus, it is desirable to provide a solution which facilitates Turing-complete functionality such as looping mechanisms and other complex control structures to be integrated or combined with blockchain scripts, while avoiding the damaging effects of potential security weaknesses such as infinite loops. Such a solution would provide numerous benefits including:

Enabling the automation of complex blockchain-related transactions;
Controlling the metadata stream that is recorded onto the Blockchain
Extending the functionality and applications of blockchain platforms which do not rely on or incorporate purposefully Turing complete languages Such an improved solution has now been devised. The present invention provides a solution which comprises the novel combination of a blockchain coupled with a parallel computing resource which enables the emulation, simulation and/or incorporation of loops and other Turing-complete functionality outside the typical blockchain script. In turn, this facilitates numerous applications for automated tasks relating to, for example, distributed data storage, distributed computing and the control of drones, or any IoT (Internet of Things) devices. Such applications may include using the blockchain for metadata storage, managing digital tokens and establishing contracts. Another useful application is the automation of a vote or selection-counting process.

The following provide background material to the technical field of the present invention: US2016/027229 A; WO2016/022864 A and U.S. Pat. No. 6,061,449 A. The following on-line resources, also available at the time of filing, provide technical background:
https://nxt.org/what-is-nxt/voting/
http://bitcoin-development.narkive.com/uRciVtAQ/standard-bip-draft-turing-pseudocompleteness
https://news.ycombinator.com/item?id=7287155
https://news.ycombinator.com/item?id=11372455
http://cryptonomics.org/2014/02/01/ethereum-turing-complete Thus, in accordance with the present invention there is provided a solution as defined in the appended claims. In accordance with the invention there may be provided a (process) control method and corresponding system. The invention may be referred to as a blockchain-implemented control method/system. It may control an automated task or process.

The invention may be arranged to use a blockchain to emulate/simulate Turing completeness. Additionally or alternatively, the invention may enable applications which involve Turing complete control mechanisms to be executed on a blockchain platform.

Additionally or alternatively, the invention may be described as a method or system arranged to use a blockchain and/or one or more blockchain transactions to control a process executing on an off-block computing resource. Thus, the invention comprises an arrangement wherein distinct computing components, which are functionally and architectural different from each other, are arranged to interact so as to provide a novel technical result. The interaction of the different computing systems (computing resource and blockchain) results in a highly powerful control solution.

From the perspective of the computing resource, the invention provides the advantage of a permanent, tamper-proof record of the execution of the program. From the blockchain perspective, the invention provides an improved blockchain implementation because it enables Turing-complete behaviour to be at least partially simulated via use of the blockchain, which in turn enables more functionally complex blockchain-based applications to be deployed. This is all achieved while maintaining the use of the limited scripting language for the blockchain transactions. The scripting language may be limited (restricted) in that its design or implementation prevents or at least does not natively support the incorporation of complex control flow mechanisms such as loops into code written in that language. The instructions set of the language i.e. the "commands" or "op-codes" that the programmer can use, may be arranged such that it does not include commands for complex flow control mechanisms.

The blockchain may be associated with, or used with, a blockchain protocol which comprises a limited language. This may be a scripting language. The invention may extend the functionality of a limited scripting language for the execution of tasks using the blockchain.

The invention may use the state of the blockchain to execute a loop-based process. The loop-based process may be performed on a computing resource operating in parallel to the blockchain network. The computing resource may be distinct from (not part of) the blockchain network. The computing resource may be referred to as an "oracle" or a "bot".

This enables the blockchain protocol to utilise a functionally limited scripting language while allowing control flow mechanisms such as looping mechanisms to be implemented off the blockchain. This novel combination enhances the versatility of blockchain technology while preserving security.

In accordance with one or more embodiments of the invention there may be provided a computer-implemented event handling, monitoring, detecting and/or counting process and corresponding system. Embodiments of the invention may be arranged to respond to events which are generated by an entity. The invention may monitor/detect and/or count votes, selections or decision or other types of events. For the sake of convenience herein, the terms "vote" or "decision" may be used to refer to the event which is monitored, counted, recorded and/or detected etc by the invention.

One or more embodiments of the invention may be described as a control method and corresponding system. It may be described as a blockchain implemented method/system. The invention may be arranged to control a process. The process may be an industrial or non-industrial process. The event eg decision may be made by a machine, electronic/software-based entity, natural person(s), legal entity or other. One or more embodiments of the invention may comprise a method/system for counting, monitoring, recording, detecting and/or otherwise handling events. The events may be decisions or selections eg votes made by entities within an application area. It is not restricted to counting politically-oriented votes or events in a political context, although it could be used for this purpose. It may be used, for example, to record how many times a machine makes a certain selection, or how many times a cell mutates etc. The decision may be a binary or non-binary decision. It may count or record how many times an event occurs/does not occur.

The method may comprise the steps:
distributing or allocating at least one token to at least one predetermined entity, wherein the at least one token is represented by a cryptographic public key and private key pair; and
executing a loop on a computing resource to maintain a count of one or more events (e.g. votes, selections, actions or decisions) generated by the at least one entity.

The invention may provide a computer-implemented vote or decision counting process, comprising the steps:
distributing or allocating at least one token to at least one predetermined entity, wherein the at least one token is represented by a public key and private key pair; and
executing a loop on a computing resource to maintain a count of one or more votes or decisions made by the at least one entity.

The cryptographic key pair may be referred to as a "blockchain public and private key pair". It may be arranged for use with a blockchain platform, and for secure transfer of value between blockchain transaction inputs and outputs, as is known in the art. A key may function as a blockchain address.

The invention may provide a computer-implemented vote or decision counting method comprising the steps:
distributing or allocating at least one token to at least one predetermined entity, wherein the at least one token is represented by a blockchain public key and private key pair; and executing a loop on a computing resource, the loop being implemented using a script, to maintain a count of one or more votes or decisions generated by or associated with the at least one entity; and generating a cryptographic hash of the script.

The invention may provide a computer-implemented vote or decision counting method comprising the steps:

distributing or allocating at least one token to at least one predetermined entity, wherein the at least one token is represented by a blockchain public key and private key pair; and executing a loop on a computing resource to maintain a count of one or more votes or decisions made by the at least one entity wherein information relating to at least one iteration of the loop is stored in a transaction on the blockchain.

The invention may provide a computer-implemented vote or decision counting method comprising the steps:

distributing or allocating at least one token to at least one predetermined entity, wherein the at least one token is represented by a blockchain public key and private key pair;

executing a loop on a computing resource to maintain a count of one or more votes or decisions made by the at least one entity; and generating a cryptographic hash of code relating to the loop; and preferably comprising the step of storing the cryptographic hash within a transaction on the blockchain.

The invention may provide a computer-implemented vote or decision counting method comprising the steps:

distributing or allocating at least one token to at least one predetermined entity, wherein the at least one token is represented by a blockchain public key and private key pair; and executing a loop on a computing resource to maintain a count of one or more votes or decisions made by the at least one entity wherein the computing resource is arranged to monitor the state of the blockchain for a transaction comprising a cryptographic hash of code relating to the loop.

The at least one predetermined/preselected entity may be a machine, electronic/software-based entity. In other embodiments, the entity may be a natural person(s), legal entity or other. The blockchain may be the Bitcoin Blockchain or some other blockchain platform. Distribution may be performed by broadcasting to the blockchain network. There may be a plurality of entities (e.g. voters or decision makers). At least one token may be distributed and/or allocated to each of the respective entities within the plurality.

The count of one or more votes or decisions may be stored in the blockchain (e.g. in a transaction) and/or the alternate stack of the blockchain.

The method may comprise the step of implementing the loop using a script. The script may be written in a scripting language. It may be based on the Forth scripting language. The language may be non-Turing complete. It may be a stack-based language. The scripting language may be limited (restricted) in that its design or implementation prevents or at least does not natively support the incorporation of complex control flow mechanisms such as loops into code written in that language. The instructions set of the language i.e. the "commands" or "op-codes" that the programmer can use, may be arranged such that it does not include commands for complex flow control mechanisms The method may further comprise the step of generating a cryptographic hash of the script or a portion thereof.

The method may further comprise the step of using a secret exchange protocol to distribute and/or allocate the at least one token to the at least one entity.

The method may further comprise the step of loading each public key and address with an item representative of one or more choices, preferably wherein the item is an amount of currency. The currency may be Bitcoin-related.

The method may further comprise the step of maintaining, on or in association with the computing resource, a list of public keys associated with each authorized entity and/or token. The method may further comprise the step of destroying (and/or never storing) the list of private keys and a mapping/association between the identity of the entity and their allocated token.

The method may further comprise the step of maintaining a list of addresses. The list may be an empty list or comprise one or more addresses. At least one address may be associated with the least one entity. Preferably, at least part of the list is specified, represented or defined in a blockchain script.

The method may further comprise the step of transferring the list of addresses to the (blockchain) alternate stack for storage; preferably wherein an address is removed from the alternate stack once a vote for that address (or other condition) has been counted, detected and/or otherwise handled.

The method may further comprise the step of executing the loop until the list of addresses becomes empty.

The method may comprise the steps of:
executing the loop on a computing resource (eg server or plurality of servers); and
using the state of the blockchain to influence the execution of the loop; and/or influencing the state of the blockchain as a result of executing the loop.

The computing resource may be any processor-based device or system. It may, for example, be a server or plurality of servers. It may be a standalone or a distributed resource. The blockchain may be the Bitcoin blockchain or any other blockchain-related platform. The blockchain may be a consensus-based electronic ledger.

Information relating to at least one iteration of the loop may be stored in a transaction on the blockchain. The information may be stored as metadata in the transaction. The loop may contain a "If condition then action" (ICTA) instruction.

The method may further comprise the step of generating a cryptographic hash of code relating to the loop and, preferably, storing the cryptographic hash within a transaction on the blockchain. The code may be a code block containing a control flow statement, such as an "If condition then action" statement.

The computing resource may be arranged to monitor the state of the blockchain for a transaction comprising a cryptographic hash of code relating to the loop.

The method may further comprise the steps:
for each iteration of the loop:
evaluating a condition and performing at least one action based on the outcome of the evaluation, wherein the at least one action comprises:
causing at least one transaction to be written to the blockchain; and/or
causing an off-blockchain action to be performed.

The condition may be used to monitor any value, signal or input, regardless of where, how or by whom it is generated, either on or off the blockchain. The condition may relate to data received, detected or generated by the computing resource; and/or the state of the blockchain. The condition may be described as a "trigger". It may be or relate to a particular state of the blockchain, or an event detected off-block (e.g. a date or temperature reading, etc.), or a combination of both.

The Action may include sending a signal to cause an event off clock, or broadcasting a new transaction, or a combination of both. The index may be maintained (i) off block within the Manager or may be (ii) a value stored within a transaction that is then broadcast. (i) and (ii) represent two alternative ways to maintain the control data.

The computing resource may be arranged to monitor:
the state of the block chain; a value generated or received by the computing resource;
and/or a data or signal source provided off the blockchain.

The method may comprise the steps of:
i) using the blockchain as a storage component for data, instructions or a pointer to data and/or instructions; and
ii) using a computing resource as a control flow management component for a Turing complete process, the computing resource being arranged to execute a looping mechanism.

Thus, the blockchain may serve as the non-erasable tape of a Turing machine. The computing resource may serve to control the flow of execution of the process, implementing a loop and extending the functionality of the scripting language.

The method may further comprise the step of restarting (respawning) the loop at a specified iteration. The loop may be restarted if the computing resource finds a predetermined hash of a portion of code in a transaction within the blockchain. The portion of code may relate to the body of the loop. It may comprise an ICTA statement.

The computing resource may respawn the loop at each iteration. This may be performed in a variety of ways. For example, a code block for the loop may be:
hard-coded into the computing resource itself;
stored in a private or publicly available file;
stored as an entry on a private or public hash table file;
or a combination of the above.

The code block may be static with hard-coded variables or may be static but contain parameter(s) that can be populated. The parameters may be single values of any data format, or could be small chunks of code, or combinations of the above. The parameters may be populated by retrieving them directly from metadata in a transaction (e.g. bitcoin transaction) or from an external source such as an internal database or a private/public file or hash table or any combination of the above. Pointers to the external source of parameter values may be stored in metadata in a transaction.

The information relating to the iteration may be specified using metadata provided within, or in association with, the transaction.

The computing resource may comprise or be in communication with a registry which enables the computing resource to access a pre-stored version of the subroutine. The registry may alternatively be described as a database, repository or other form of storage facility. The registry may store:
i) a cryptographic hash of code relating to the loop; and
ii) information indicative of a location where a copy of the code can be accessed from.

The method may further comprise the step of using a blockchain transaction to update code for the loop so that the existing code is replaced with new code. Preferably, the transaction is a multi-signature P2SH transaction. A hash of the existing code and a hash of the new code may be stored.

The invention also provides a system for implementing any embodiment of the method described above.

The invention may provide a computer-based system. It may be described as a computer-implemented event counting, monitoring, detecting and/or handling system. The event may be a vote, decision, selection or any other type of event. It may be arranged to simulate or emulate Turing completeness. The system may comprise:
a blockchain; and
a computing resource arranged to execute a loop such that execution of the loop is influenced by state of the blockchain.

Information relating to at least one iteration of the loop is stored in a transaction on the blockchain. Preferably, the information is stored as metadata in the transaction.

Preferably, the computing resource is arranged to generate a cryptographic hash of code relating to the loop. Preferably, the cryptographic hash is stored within a transaction on the blockchain. Additionally or alternatively, the computing resource is arranged to monitor the state of the blockchain for a transaction comprising a cryptographic hash of code relating to the loop.

Preferably, for each iteration of the loop: a condition is evaluated and at least one action is performed based on the outcome of the evaluation; the at least one action comprising:
causing at least one transaction to be written to the blockchain; and/or
causing an off-blockchain action to be performed.

The condition may relate to data received, detected or generated by the computing resource; or the state of the blockchain.

The computing resource may be arranged to monitor:
the state of the block chain;
a value generated or received by the computing resource; and/or
a data or signal source provided off the blockchain;

The blockchain may serve as a storage component for data, instructions or a pointer to data and/or instructions. The computing resource may serve as a control flow management component for a Turing complete process, the computing resource being arranged to execute a looping mechanism.

The loop may be restarted at a specified iteration if the computing resource finds a predetermined hash of a portion of code in a transaction within the blockchain. The information relating to the iteration may be specified using metadata provided within, or in association with, the transaction.

The computing resource may comprise or be in communication with a storage facility which may be referred to as a registry, database or repository, and which enables the computing resource to access a pre-stored version of the subroutine. The registry may store:
i) a cryptographic hash of code relating to the loop; and
ii) information indicative of a location where a copy of the code can be accessed from.

The system may be configured to use a blockchain transaction to update code for the loop so that the existing code is replaced with new code. Preferably, the transaction is a multi-signature P2SH transaction. Preferably, the system is arranged to store a hash of the existing code and a hash of the new code.

Any feature described in relation to one aspect or embodiment of the invention may also be applicable in respect of any other aspect or embodiment. For example, any feature described in relation to the method may also be used in relation to the system, and vice versa.

These and other aspects of the present invention will be apparent from and elucidated with reference to, the embodiment described herein. An embodiment of the present invention will now be described, by way of example only, and with reference to the accompany drawings, in which:

FIG. 3 shows an example of a ICTA (If Condition Then Action) code block which can be used in accordance with an embodiment of the invention.

FIG. 4 shows the bitcoin commands that allow users to move data in and out of the alternative stack, in accordance with an embodiment of the invention.

FIG. 5 shows the Manager's code registry in accordance with an embodiment of the invention.

FIG. 6 shows metadata associated with the Manager's code block, in accordance with an embodiment of the invention.

FIG. 7 shows metadata associated with the output at a particular iteration of the Manager's loop, in accordance with an embodiment of the invention.

FIG. 8 shows a transaction script and metadata, in accordance with an embodiment of the invention.

FIG. 9 shows an illustrative Manager software patching verification and audit trail.

FIG. 10 shows an illustrative use of the present invention, and shows an embodiment of a vote counting bot's repeat loop in pseudocode.

Figures 1, 2:
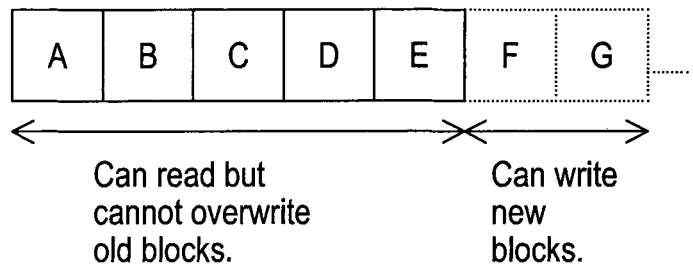
FIG. 1 shows an illustrative use of the Blockchain as a non-erasable tape for the Turing machine.
FIG. 2 illustrates a subroutine that can be used by the Manager to implement a repeat loop in conjunction with a blockchain.

The following describes an illustrative embodiment which uses the Bitcoin Blockchain. However, other blockchain protocols and implementations may be used. The invention is not limited in this regard.

The present invention addresses the problem of how to facilitate Turing Completeness on an operationally limited blockchain platform (ie one which uses a scripting language that does not support complex control mechanisms), and therefore extend the uses or applications to which the blockchain can be put. Marvin Minsky (Minksy et al., *Computation: Finite and Infinite Machines*, Prentice Hall, Inc, 1967) described how a non-erasable tape can be used to implement a machine that is Turing complete, and is able to execute any algorithm that can also be executed on a Universal Turing machine.

The present invention comprises a computing resource which operates in conjunction with the blockchain, using it as the non-erasable tape in the implementation of a Turing machine. This computing resource runs in parallel with the blockchain network, overseeing and handling the execution of a looping process. The looping process is designed to perform a given task such as, for example, the automation of a process or control of a device or system. This parallel resource monitors the state of the blockchain and can cause transactions to be written to the blockchain. Therefore, it may be referred to herein as "the Manager' for convenience of reference.

Features and advantages of the invention include:
  Enabling the Blockchain to serve as a non-erasable tape of the Turing Machine
  The function and implementation of a computer-based monitoring and management component (Manager) which operates alongside the Blockchain
  Using the Manager as the instruction table of the Turing Machine
  Managing the Manager using a code registry
  Transaction metadata relating to the Manager's code and respawning of the loop
  Using digital signatures to implement software updates to the Manager
  A special implementation of the Manager using an alternate Blockchain.

The Blockchain as the Turing Machine's Non-Erasable Tape

With reference to FIG. 1, the present invention utilises the Blockchain as a non-erasable tape of the Turing Machine, with the following definitions and features:

1. the Blockchain acts as the tape of the Turing Machine. Each transaction in the Blockchain represents a cell on the tape. This cell can contain symbols from a finite alphabet.
2. The tape head can read information from the blocks that have already been written onto the Blockchain.
3. The tape head can write new blocks, containing many transactions, to the end of the Blockchain. However, they cannot write onto blocks that already exist. As such, the Blockchain tape is non-erasable.
4. Metadata for each transaction can be stored as part of a multi-signature pay-to-script-hash (P2SH) transaction.

An important function of the Manager is to act as an agent that monitors the current state of the Blockchain. It can also receive a signal or input from any off-block source.

Depending on the Blockchain state and/or a received input, the Manager may perform certain actions. The manager decides which action(s) are to be performed. These may or may not involve actions in the 'real world' (i.e. off block) and/or actions on the Blockchain (such as creating and broadcasting new transactions). The action that the Manager takes may be triggered by the Blockchain state. The Manager may also decide on the next set of transactions to be broadcast to the Bitcoin network, and subsequently written to the Blockchain.

The Manager's action(s) run in parallel and simultaneously to the Bitcoin network. In a sense, this extends the function of the behaviourly-restricted Bitcoin script. This continuous monitoring implements the 'loop' control-flow constructs making the combined Manager and Blockchain system Turing Complete.

The Manager as the Turing Machine's Instruction Table

In accordance with an embodiment of the invention, the Turing Machine includes two stacks:
  Data stack: This is represented by the Blockchain as described above.
  Control stack: This is represented by the Manager function. This stores information relating to the repeat control-flow function.

The separation of the control stack from the data stack provides the advantage of preventing infinite loops from occurring within the Bitcoin core. This in turn mitigates denial-of-service attacks on the Bitcoin system.

The Manager manages and runs subroutines that are able to loop via any type of loop construct (e.g. FOR-NEXT; REPEAT UNTIL; etc). An illustrative embodiment described herein includes a process using one example of the 'repeat' construct (see FIG. 2). The user specifies the index (i) and the limit (J). These represent the current iteration number (typically counted starting from 0) and the total number of iterations of the repeat loop respectively.

For each iteration:
1. The Index increments by 1. For the exit condition, the iterations will stop when the index reaches the limit
2. A code block containing an "if condition then action" (ICTA) statement is executed; the action may be any action on or off the blockchain;
3. A cryptographic hash of this subroutine is computed. This can be stored in the Blockchain as part of a transaction. Since the hash is unique to each code, it will enable verification of which code has been used The body of the loop includes a code block. Each code block contains a "If condition then action" (ICTA) statement (see FIG. 3). This monitors the current state of the Blockchain for transactions matching the:

Start or triggering condition (e.g when a particular Bitcoin address reaches 10 BTC).

Repeat condition (i.e. a metadata or hash associated with the previous iteration).

Stop condition (i.e. last iteration of the loop).

The ICTA statement enables the Manager to decide on the next transaction to make, based on the current state of the blockchain. Making the next transaction involves broadcasting the transaction onto the Bitcoin network, and writing the new transaction onto the Blockchain. This acts as a record that this iteration has been executed. Once the transaction has been written onto the Blockchain, the Manager will subsequently find that the previous iteration has been executed and written onto the Blockchain, and will execute the next iteration. The latter continues until the repeat loop exits when the index (i) reaches the limit (J) specified in the code block.

Each transaction is saved in the blockchain in a way that can be reused. In a Bitcoin implementation, each signature in a transaction is appended with a SIGHASH flag. This flag can take on different values, each indicating whether other parts of the transaction can be amended without involvement of the owner of this signature. A reusable transaction has the SIGHASH flag 'SigHash_AnyoneCanPay' in one of the transaction inputs. This permits anyone to contribute to the inputs of the transaction. This parameter enables the Manager's ICTA function to be executed and repeated multiple times and with different inputs. Use of the function can be restricted to authorised parties—for example, via copyright of the reusable transaction.

The 'If condition' section of the ICTA code block can monitor any type of condition. This is similar to other programming languages (e.g. C, C++, Java) and not limited to information stored on the Blockchain. Some example conditions are listed below:

Monitor the date and time (i.e. when a certain date and time are reached).

Monitor the weather (i.e. when the temperature is below 10° C. and it is raining).

Monitor social media (i.e. when I've received a message from my friend).

Monitor conditions of a contract or a trust (i.e. when company A buys company B).

Monitor news and events (i.e. when soccer team A wins a match).

Monitor information from the internet of things (i.e. when a light bulb needs replacing).

Monitor data from a mobile/wearable device (i.e. when a wearable step tracking device counts 10000 steps).

Monitor results from cloud computing (i.e. when a computation is completed and results are received).

Monitor remote data storage (i.e. if file still exists remotely).

The 'Then action' section of the ICTA code block can execute a number of actions. The invention is not limited with regard to the number or type of actions that can be taken. The action is not limited to a transaction on the Blockchain, although a transaction containing metadata related to the action may be written on the Blockchain.

The metadata can be of any form specified by the Manager. However, in accordance with one embodiment of the invention, the metadata may store a hyperlink to a file containing more data or instructions relating to the action. The metadata may store both a hyperlink to a hash table containing more data or instructions relating to the action along with a hash of the action that acts as the loop-up key for the hash table. An embodiment may use a link similar in style to the BitTorrent's magnet URL format.

A list of example actions is listed below.

Bitcoin transactions (i.e. send Bitcoins to a particular address).

Social media (i.e. send a message to a friend).

Trading (i.e. sell X shares).

Internet of things (i.e. switch off a light bulb).

Commerce (i.e. purchase an item online).

Online services (i.e. pay a monthly fee or pay for services requested using Bitcoin).

As the invention is not limited in respect of the nature, type or number of actions performed, it provides a highly versatile solution which may be applied to great advantage over a wide range of applications.

The Manager's control stack can be implemented in a number of ways that are specific to the needs of each user. For example, the repeat loop of the control stack can be based on any Turing Complete language. One possible choice of language is the Forth style stack-based language. An advantage of using this language is that it keeps the control stack consistent in programming style with the Bitcoin scripts which are already known and in wide usage.

Using the Bitcoin Script's Alternate Stack as a Data Storage Space

The Bitcoin script contains commands, also called op codes, which enable users to move data onto an alternative stack, known as the 'alt stack'.

The op codes are:

OP_TOALTSTACK—which moves data from the top of the main stack onto the top of the alt stack.

OP_FROMALTSTACK—which moves data from the top of the alt stack to the top of the main stack (See FIG. 4).

This enables data from intermediate steps of calculations to be stored in the alt stack, similar to the 'memory' function which allows data to be stored on the calculator. In accordance with an illustrative embodiment of the invention, the alt stack is used for configuring bitcoin scripts to solve small computation tasks and returning the results in the computation.

Using a Code Register to Manage the Manager

The Manager also manages a registry of all the codes that it owns and runs. This registry is structured like a lookup table or dictionary that maps a specific key to a specific value (see FIG. 5). The key and value pair is represented by the hash of the code block ($H_1$) and the IPv6 address of where the code is stored respectively. To retrieve the code block using the key $H_1$, the lookup table is used to retrieve the associated value (this is the location where the code is stored) and retrieves the source code accordingly.

The implementation of the code registry can vary. For example, the lookup table can be implemented using a locally managed list, or a P2P distributed hash table. The source code can be stored locally, remotely, or using a decentralized file storage system. This could be implemented with a magnet URI format or any link format that uses shared zero knowledge encryption.

Transaction Metadata of the Manager's Code, and Re-Spawning of the Loop

Information required to respawn the Manager's loop at a particular iteration is stored as metadata in the transaction recorded on the Blockchain (see FIG. 6 and FIG. 7).

In this way, a transaction on the blockchain stores or provides access to information about a given iteration of the loop which is being executed on the Manager. This information can include the values of any variables associated with the loop, such as index i, and any other necessary information such as values for parameters used in the code block or location-related data specifying where further required information can be accessed.

The metadata itself is stored as part of a multi-signature pay-to-script-hash script (P2SH) in the transaction. See FIG. 8 for the script's format. The metadata recorded with the transaction also gives the ability to record an audit trail of how the code has been executed in the past.

There are several ways in which the Manager could respawn the repeat loop code block at each iteration. The code block might be hard-coded into the Manager itself, or could be stored in a private or publicly available file, or stored as an entry on a private or public hash table file, or a combination of the above. The code block could be static with hard-coded variables or could be static but contain parameter(s) that can be populated. The parameters could be single values of any data format, or could be small chunks of code, or be combinations of the above. The parameters could be populated by retrieving them directly from metadata in a transaction (e.g. bitcoin transaction) or from an external source such as an internal database or a private/public file or hash table or any combination of the above. Pointers to the external source of parameter values might be stored in metadata in a transaction.

The following steps provide one example of how the Manager can respawn a repeat loop code block at the ith iteration. In this example, the code registry is a hash table whereby the hash values act as look-up keys for the table and are stored in metadata on transactions.

1. The Manager monitors the Blockchain for transactions that contain hashes of the code block that matches entries in the code registry.
2. The Manager finds a transaction that contains the corresponding hash ($H_1$).
3. The Manager reads the 'Metadata-CodeHash', gets the CodeHash field to get $H_1$ and uses it to retrieve the code ($C_1$). If RIPEMD-160(SHA256($C_1$)) equals $H_1$, the code has not been changed and it is safe to proceed to the next step.
4. The Manager reads the 'Metadata-CodeHash' which stores the index I, and respawns the code at the $i^{th}$ iteration. In other words, the loop is 'reloaded' at the appropriate iteration
5. The signature of the User is included in the P2SH command to verify the origin of the metadata.
6. The Manager reads the 'Metadata-OutputHash' and 'Metadata-OutputPointer' (see FIG. 6) to retrieve the output of the previous steps, if these data are required for this iteration of the loop.

Multiple signatures may be required to unlock the transaction (e.g. the User, the Operating System, the Software Developer and the Software Vendor). This enables a digital rights management (DRM) system for managing the rights to operate the codes by all parties involved in the P2SH transaction.

Updating the Manager's Code

Software updates and patches for code blocks that relate to the Manager are securely authorized using a multi-signature P2SH transaction (see FIG. 8). The multi-signature transaction records metadata of the old and new code blocks as shown in FIG. 5. This makes a record of the changeover of the old code to the new code, thereby providing an audit trail of the software update. The Manager needs to store all hashes of the old and new blocks of source codes. The hash of the new and old source code blocks can be used to verify the integrity of the code files.

In accordance with an embodiment of the invention, multiple signatures are required to unlock the transaction (e.g. the User, the Operating System, the Software Developer and the Software Vendor). This provides a DRM system for managing software updates and patches for codes that are used by the Manager.

Unlike most software, which does not allow software to be updated while it is running, an advantage of the present invention is that software updates can occur in the middle of executing a loop. This provides a dynamic and responsive solution which can be reconfigured in real-time and with minimal disruption to the process which is being controlled by the invention.

The information captured on the Blockchain (see FIG. 8 and FIG. 9) can be used to update to the new code in the middle of a loop, and start the next iteration step using the output metadata from the previous iteration from the old code.

The Vote Counting Invention

The current Bitcoin scripting language does not allow loops to take place. This prevents using Bitcoin payments from triggering continuous and automated actions unless there is external intervention. However, as the Manager continuously monitors information on the Blockchain, this allows automated actions to be performed based on up-to-date information on the Blockchain.

The following illustrates how the Manager's control stack can be used to automate processes involving an automated and online vote counting bot.

The vote counting bot of the present invention is designed to facilitate fair and pseudo-anonymous voting, with the Blockchain recording a secure and immutable audit trail of the vote counting process. The vote counting bot is automated using the Manager's control stack and repeat loop (see FIG. 10). The following scenario illustrates how an embodiment of this may operate.

Let us assume that there are 100 voters. If 57 unique "Yes" votes are received before 1 Jan. 2016, payments will be released to the Chair, Jason. The voting process is divided into two parts:

Token distribution

Counting

For the token distribution, 100 voting tokens are distributed, one to each authorized voter. Each token is represented by a (e.g.) Bitcoin public key and private key pair. This is distributed to each voter using a secret exchange protocol. Key exchange protocols are known in the art. Each Bitcoin public key and address is loaded (associated) with a small amount of Bitcoin representing one vote. The bot keeps the list of public keys associated with each authorized token and makes this list public before voting begins. To ensure voting cannot be rigged and that voting is anonymised, the list of private keys and the mapping between the voter's identity and their token is destroyed (i.e. never stored).

Having an anonymized and pre-authorized list of addresses provides other important benefits. It ensures that only those who are authorized can cast a valid vote. It can also facilitate the exclusion of any unwanted votes that originate from particular addresses (e.g. spammers, disqualified voters) without compromising the identity of the voters. To implement the counting process, the Manager runs a repeat loop. The list of addresses are be kept in the bitcoin script, and transferred to the alternate stack for storage of data. Once an address has been counted, it is removed from the alternate stack and no longer added to the next transaction. The repeat loop stops when the list of addresses becomes empty.

Instead of using the integer index i to keep track of where the loop is currently at, the vote bot Manager uses it to store the intermediate value of the vote count. This ensures that the intermediate value of vote count is stored in the Blockchain. This provides an audit trail, and shows that the vote counting process is fair.

If the amount of unique "Yes" votes received reaches 57, the agreed amount of Bitcoins will be paid to Jason's account. The cryptographic hash of the vote counting script, and the IPv6 address of where this script is stored, are released to the public. This means that the public has enough information to perform a recount, and ensure the vote counting process is fair and correct.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented event counting or handling method, the method comprising the steps:
   distributing or allocating at least one token to at least one predetermined entity, wherein the at least one token is represented by a blockchain public key and private key pair; and
   executing, overseeing, or managing a loop on at least one computing resource operating in parallel to or conjunction with a Bitcoin-based blockchain or Bitcoin-based blockchain-related platform to maintain a record or count of one or more events generated by the at least one predetermined entity; and
   implementing the loop using a script.

2. A method according to claim 1 wherein:
   i) the one or more events is a vote, selection, decision or action made by the at least one entity; and/or
   ii) the count of one or more events is stored in the blockchain and/or an alternate stack of the blockchain.

3. A method according to claim 1 further comprising the step of generating a cryptographic hash of the script.

4. A method according to claim 1 further comprising the step:
   using a secret exchange protocol to distribute or allocate the at least one token to the at least one entity.

5. A method according to claim 1 further comprising the step:
   loading each public key and address with an item representative of one or more choices or possible courses of action, wherein the item is an amount of currency.

6. A method according to claim 1 further comprising the step:
   maintaining, on or in association with the computing resource, a list of public keys associated with each authorized entity and/or token.

7. A method according to claim 6 further comprising the step:
   destroying or never storing a list of private keys and a mapping between an identity of the entity and their allocated token.

8. A method according to claim 1 further comprising the step:
   maintaining a list of addresses, wherein at least one address is associated with the least one entity, wherein the list is represented or defined in a blockchain script.

9. A method according to claim 8 further comprising the step:
   transferring the list of addresses to an alternate stack for storage, wherein an address is removed from the alternate stack once a vote for that address has been counted.

10. A method according to claim 9 further comprising the step:
    executing the loop until the list of addresses becomes empty.

11. A method according to claim 1 wherein information relating to at least one iteration of the loop is stored in a transaction on the blockchain.

12. A method according to claim 11 wherein the information is stored as metadata in the transaction.

13. A method according to claim 1 further comprising the step of generating a cryptographic hash of code relating to the loop and, storing the cryptographic hash within a transaction on the blockchain.

14. A method according to claim 1 wherein the computing resource is arranged to monitor a state of the blockchain for a transaction comprising a cryptographic hash of code relating to the loop.

15. A method according to claim 1 further comprising the step:
    for each iteration of the loop:
    evaluating a condition and performing at least one action based on the outcome of the evaluation, wherein the at least one action comprises:
    causing at least one transaction to be written to the blockchain; and/or causing an off-blockchain action to be performed.

16. A method according to claim 15 wherein the condition relates to:
    data received, detected or generated by the computing resource; or
    a state of the blockchain.

17. A method according to claim 1 wherein the computing resource is arranged to monitor:
    a state of the block chain;
    a value generated or received by the computing resource; and/or
    a data or signal source provided off the blockchain.

18. A method according to claim 1 comprising the steps:
i) using the blockchain as a storage component for data, instructions or a pointer to data and/or instructions; and
ii) using a computing resource as a control flow management component for a Turing complete process, the computing resource being arranged to execute a looping mechanism.

19. A method according to claim 1 further comprising the step:
restarting the loop at a specified iteration if the computing resource finds a predetermined hash of a portion of code in a transaction within the blockchain.

20. A method according to claim 11 wherein information relating to the at least one iteration is specified using metadata provided within, or in association with, the transaction.

21. A method according to claim 1 wherein code for the loop is:
hard-coded into or on the computing resource;
stored in a private or publicly available file; and/or
stored as an entry on a private or public hash table file; and/or a static code block with hard-coded variables or at least one parameter.

22. A method according to claim 1 wherein code for the loop is associated with or comprises at least one parameter which is:
populated, initialised or instantiated with a single value of any data format;
a portion of code;
retrieved from metadata in a blockchain transaction or from an source external to the computing resource;
retrieved from a database, or a private or public file or hash table; and/or
populated using values which are accessed using at least one pointer to a data source, wherein the at least one pointer is stored as metadata in a transaction on the blockchain.

23. A method according to claim 1 wherein the computing resource comprises or is in communication with a registry which enables the computing resource to access a pre-stored version of a subroutine having the loop.

24. A method according to claim 23 wherein the registry stores:
i) a cryptographic hash of code relating to the loop; and
ii) information indicative of a location where a copy of the code can be accessed from.

25. A method according to claim 1 further comprising the step of:
using a blockchain transaction to update code for the loop so that existing code is replaced with new code;
wherein the transaction is a multi-signature P2SH transaction.

26. A method according to claim 25 further comprising the steps:
storing a hash of the existing code and a hash of the new code.

27. A computer-based system arranged to implement the method of claim 1, the system comprising:
the Bitcoin-based blockchain or Bitcoin-based blockchain-related platform; and
a computing resource arranged to execute the loop such that execution of the loop is influenced by state of the Bitcoin-based blockchain or Bitcoin-based blockchain-related platform and implementing the loop using a script.

28. A system according to claim 27 wherein information relating to at least one iteration of the loop is stored in a transaction on the blockchain; wherein the information is stored as metadata in the transaction.

29. A system according to claim 27 wherein the computing resource is arranged to:
i) generate a cryptographic hash of code relating to the loop and storing the cryptographic hash within a transaction on the blockchain; and/or
ii) monitor the state of the blockchain for a transaction comprising a cryptographic hash of code relating to the loop.

30. A system according to claim 27 wherein for each iteration of the loop:
a condition is evaluated and at least one action is performed based on the outcome of the evaluation; the at least one action comprising:
causing at least one transaction to be written to the blockchain; and/or causing an off-blockchain action to be performed.

31. A system according to claim 30 wherein the condition relates to:
data received, detected or generated by the computing resource; or
the state of the blockchain.

32. A system according to claim 27 wherein the computing resource is arranged to monitor:
the state of the block chain;
a value generated or received by the computing resource; and/or
a data or signal source provided off the blockchain.

33. A system according to claim 27 wherein:
i) the blockchain serves as a storage component for data, instructions or a pointer to data and/or instructions; and
ii) the computing resource serves as a control flow management component for a Turing complete process, the computing resource being arranged to execute a looping mechanism.

34. A system according to claim 28 wherein the loop is restarted at a specified iteration if the computing resource finds a predetermined hash of a portion of code in a transaction within the blockchain.

35. A system according to claim 34 wherein the information relating to the iteration is specified using metadata provided within, or in association with, the transaction.

36. A system according to claim 27 wherein the computing resource comprises or is in communication with a registry which enables the computing resource to access a pre-stored version of a subroutine having the loop.

37. A system according to claim 36 wherein the registry stores:
i) a cryptographic hash of code relating to the loop; and
ii) information indicative of a location where a copy of the code can be accessed from.

38. A system according to claim 27 wherein the system is configured to:
use a blockchain transaction to update code for the loop so that existing code is replaced with new code;
wherein the transaction is a multi-signature P2SH transaction.

39. A system according to claim 38 wherein the system is arranged to store a hash of the existing code and a hash of the new code.

40. A computer-implemented vote or decision counting method comprising the steps:
distributing or allocating at least one token to at least one predetermined entity, wherein the at least one token is represented by a blockchain public key and private key pair; and executing, overseeing, or managing a loop on at least one computing resource operating in parallel to or conjunction with a Bitcoin-based blockchain or Bitcoin-based blockchain-related platform, the loop being implemented using a script, to maintain a record or count of one or more votes or decisions generated by or associated with the at least one predetermined entity; and generating a cryptographic hash of the script.

41. A computer-implemented vote or decision counting method comprising the steps:
- distributing or allocating at least one token to at least one predetermined entity, wherein the at least one token is represented by a blockchain public key and private key pair; and
- executing, overseeing, or managing a loop implemented using a script on at least one computing resource operating in parallel to or conjunction with a Bitcoin-based blockchain or Bitcoin-based blockchain-related platform to maintain a record or count of one or more votes or decisions made by the at least one predetermined entity,
- wherein information relating to at least one iteration of the loop is stored in a transaction on the Bitcoin-based blockchain or Bitcoin-based blockchain-related platform.

42. A computer-implemented vote or decision counting method comprising the steps:
- distributing or allocating at least one token to at least one predetermined entity, wherein the at least one token is represented by a blockchain public key and private key pair;
- executing, overseeing, or managing a loop on at least one computing resource operating in parallel to or conjunction with a Bitcoin-based blockchain or Bitcoin-based blockchain-related platform to maintain a record or count of one or more votes or decisions made by the at least one predetermined entity;
- generating a cryptographic hash of code relating to the loop; and
- comprising the step of storing the cryptographic hash within a transaction on the Bitcoin-based blockchain or Bitcoin-based blockchain-related platform.

43. A computer-implemented vote or decision counting method comprising the steps:
- distributing or allocating at least one token to at least one predetermined entity, wherein the at least one token is represented by a blockchain public key and private key pair; and
- executing, overseeing, or managing a loop on at least one computing resource operating in parallel to or conjunction with a Bitcoin-based blockchain or Bitcoin-based blockchain-related platform to maintain a record or count of one or more votes or decisions made by the at least one predetermined entity,
- wherein the computing resource is arranged to monitor a state of the Bitcoin-based blockchain or Bitcoin-based blockchain-related platform for a transaction comprising a cryptographic hash of code relating to the loop.

* * * * *